United States Patent
Sethia

(10) Patent No.: US 6,694,441 B1
(45) Date of Patent: Feb. 17, 2004

(54) POWER MANAGEMENT METHOD AND ARRANGEMENT FOR BUS-COUPLED CIRCUIT BLOCKS

(75) Inventor: Rajeev Sethia, Chandler, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 601 days.

(21) Appl. No.: 09/713,073

(22) Filed: Nov. 15, 2000

(51) Int. Cl.$^7$ .................................................. G06F 1/32

(52) U.S. Cl. ........................................................ 713/322

(58) Field of Search .............................. 713/300, 320, 713/322, 324

(56) References Cited

U.S. PATENT DOCUMENTS

| | | |
|---|---|---|
| 5,345,564 A | 9/1994 | Morson et al. |
| 5,987,620 A | * 11/1999 | Tran ............................ 713/600 |
| RE36,839 E | 8/2000 | Simmons et al. |
| 6,154,803 A | 11/2000 | Pontius et al. |

FOREIGN PATENT DOCUMENTS

GB      2229024 A    9/1990

* cited by examiner

Primary Examiner—Thomas M. Heckler
(74) Attorney, Agent, or Firm—Peter Zawilski

(57) ABSTRACT

A power management system permits power-reduced operation of selected circuit blocks in a manner that requires no modification to other bus-coupled circuit blocks attempting to communicate with such selected circuit blocks. Consistent with one embodiment of the present invention, the approach is implemented in a digital electronic circuit arrangement having an accessing circuit block coupled to a clocked circuit block over a data bus. The clocked circuit block is power managed by decreasing, e.g., reducing or blocking, the clock speed to the clocked circuit block which impedes its ability communicate over the data bus. Once the clocked circuit block is set in a reduced power mode, the bus is monitored for data-access communications from the accessing circuit block to the clocked circuit block. In response to such a communication, a substitute response is generated on the data bus, directed to the accessing circuit block, and the clock speed to the clocked circuit block, is increased and brought out of the reduced power mode for further communications with the accessing circuit block.

20 Claims, 16 Drawing Sheets

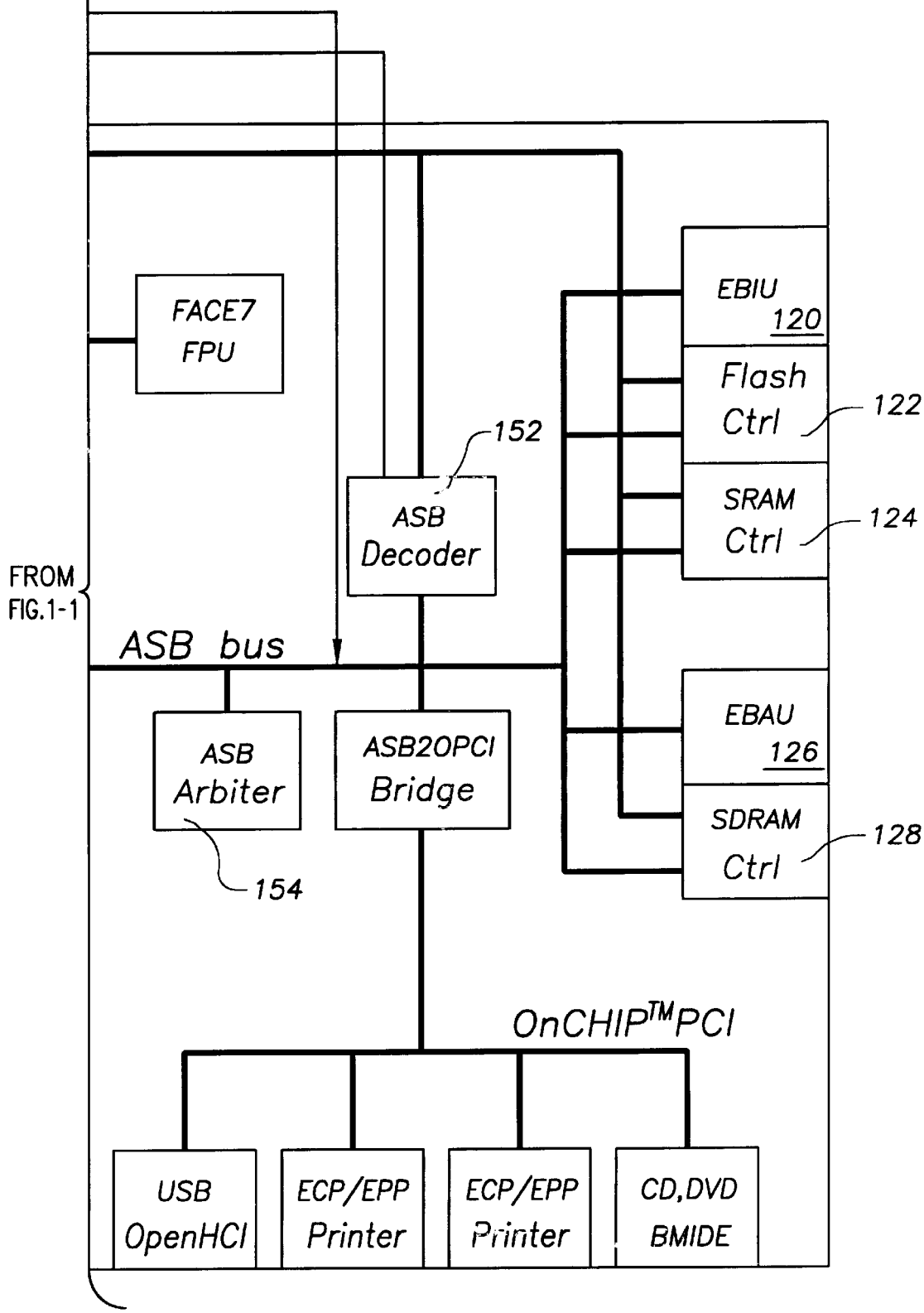

FIG.2A
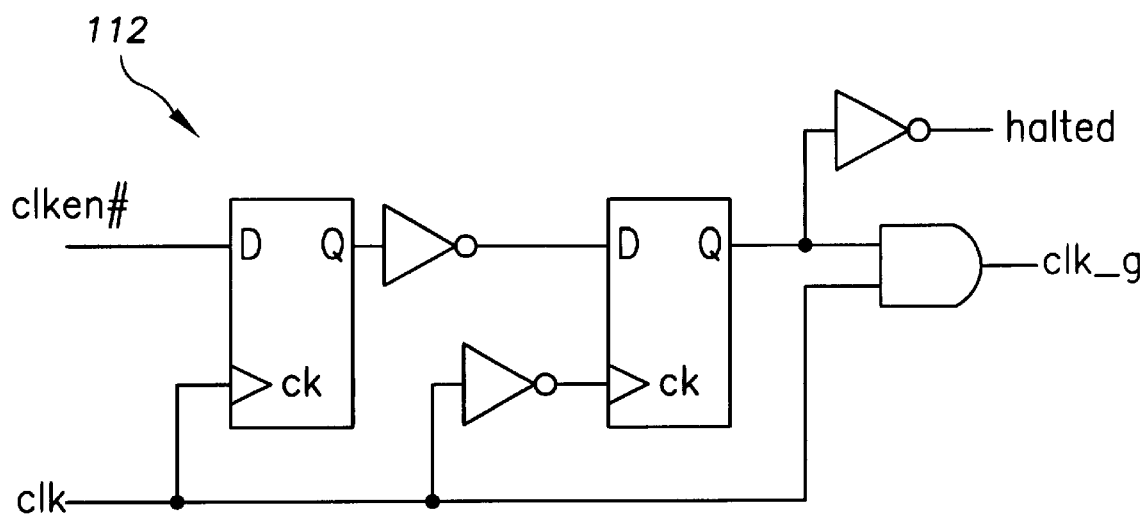
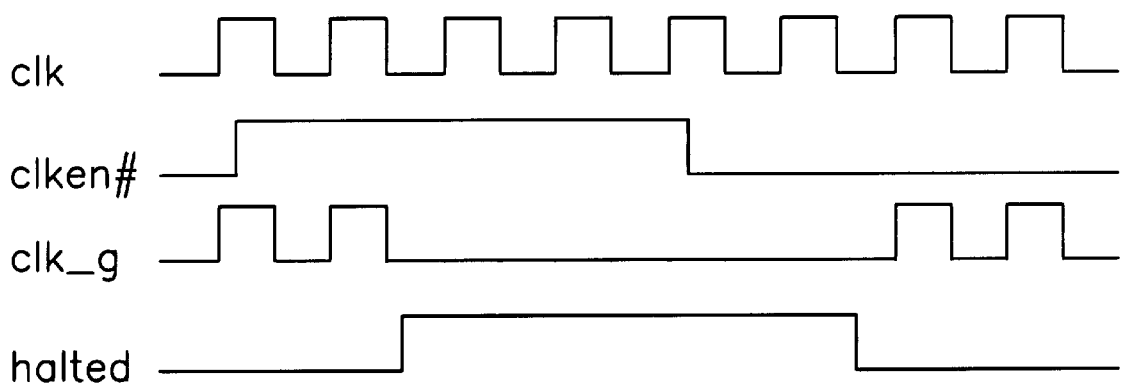

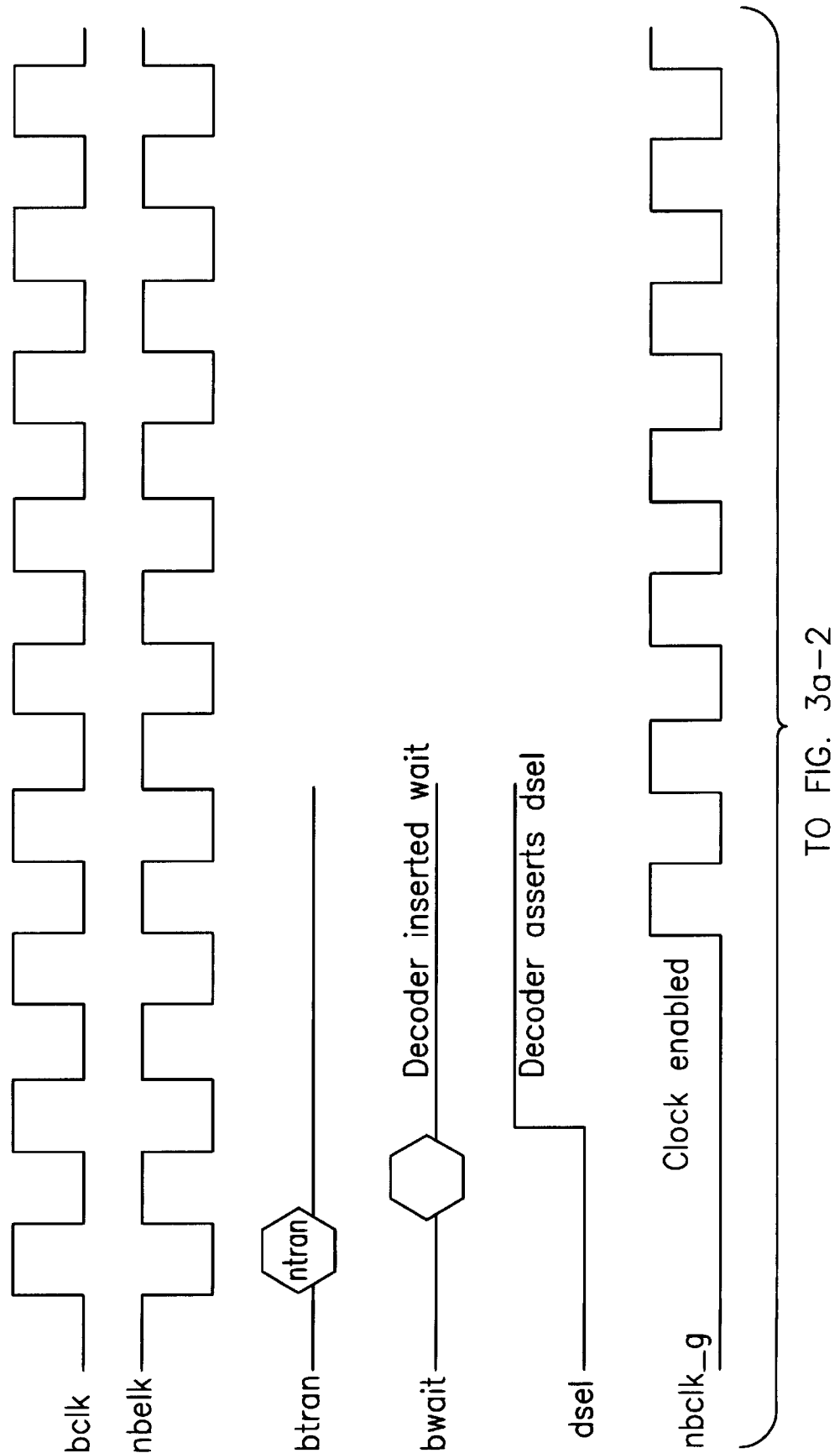

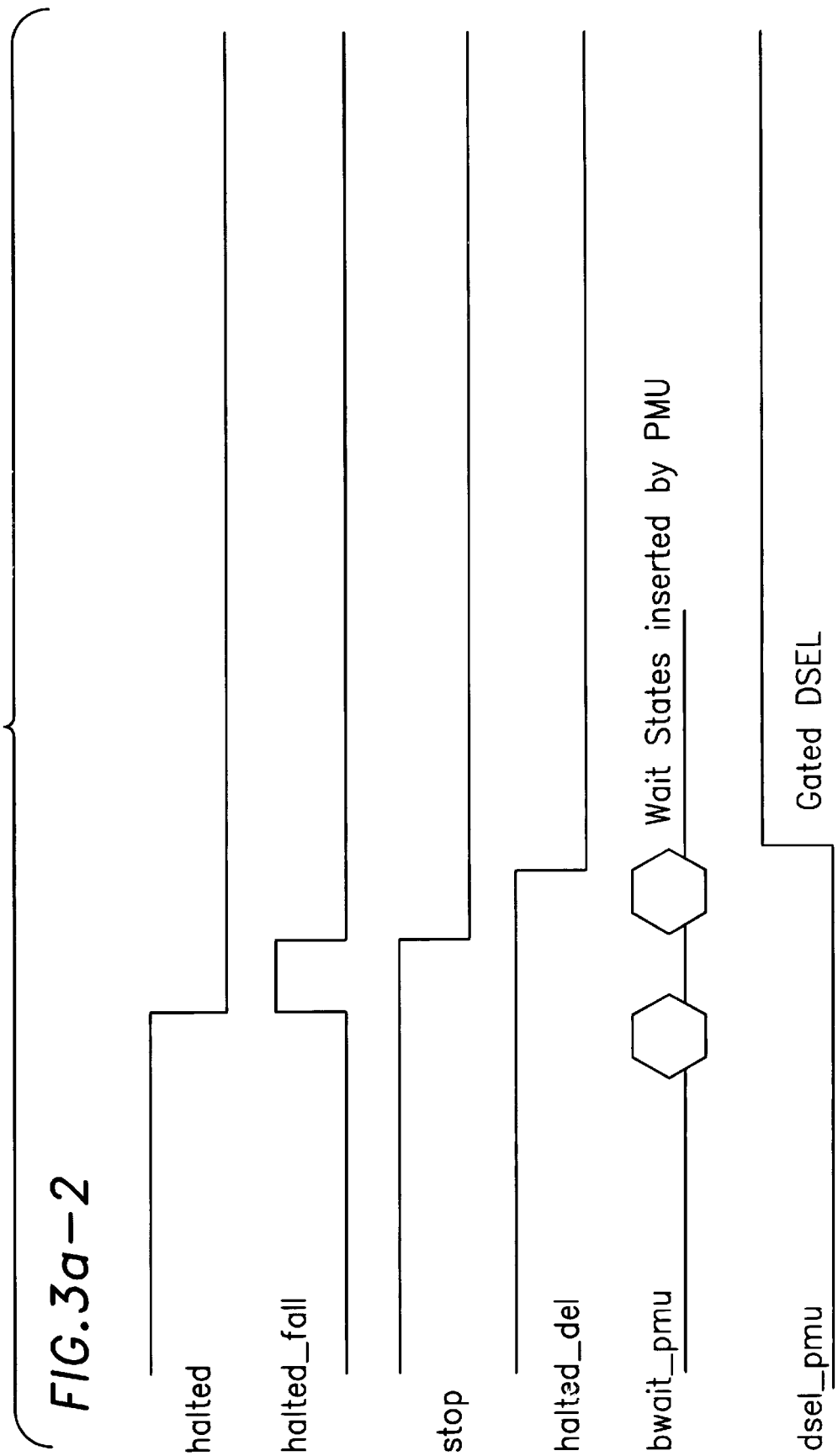

FIG.3b-2

FROM FIG. 3b-1 halted halted_fall stop halted_del bwait_pmu — Wait States inserted by PMU dsel_pmu — Gated DSEL

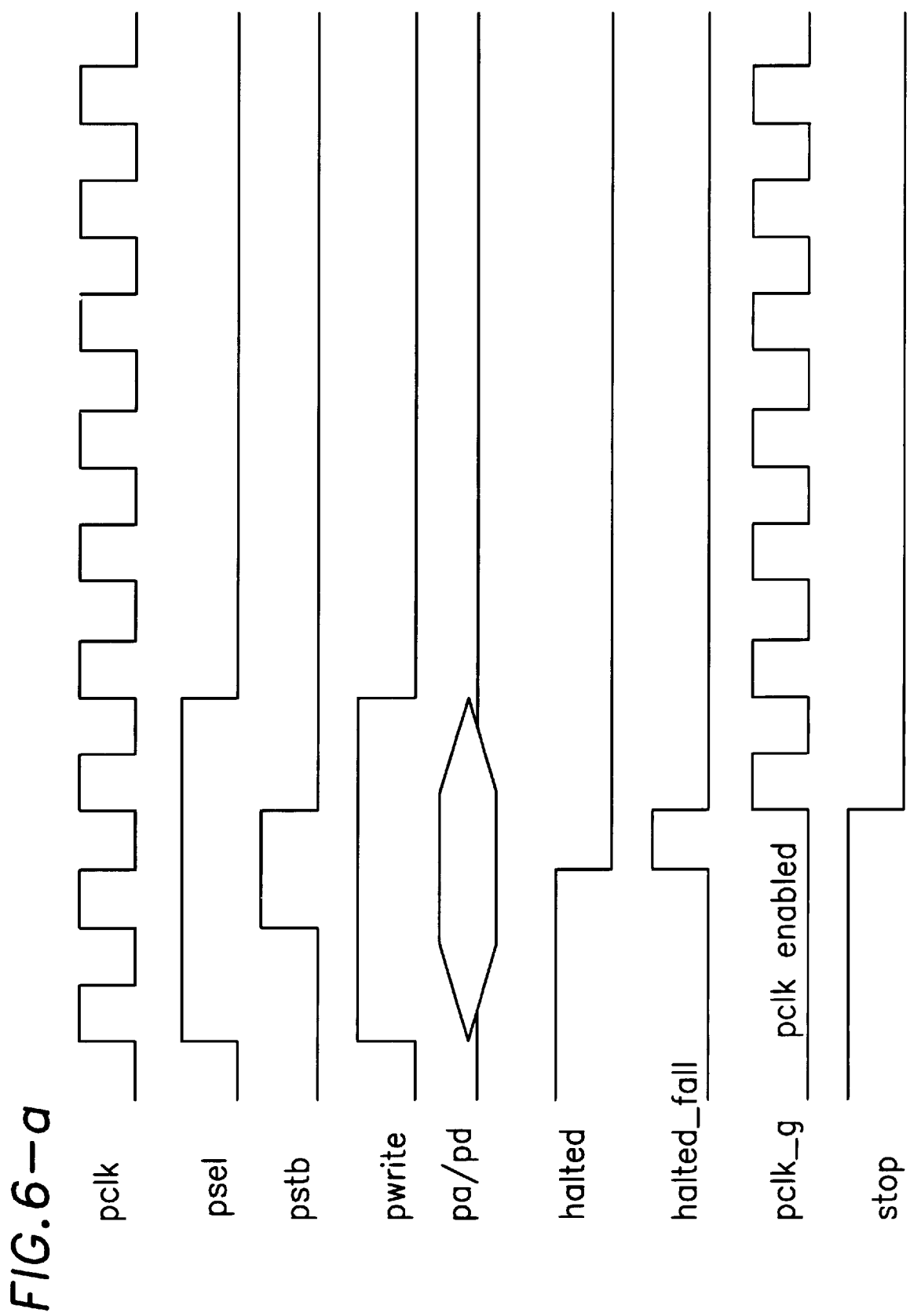

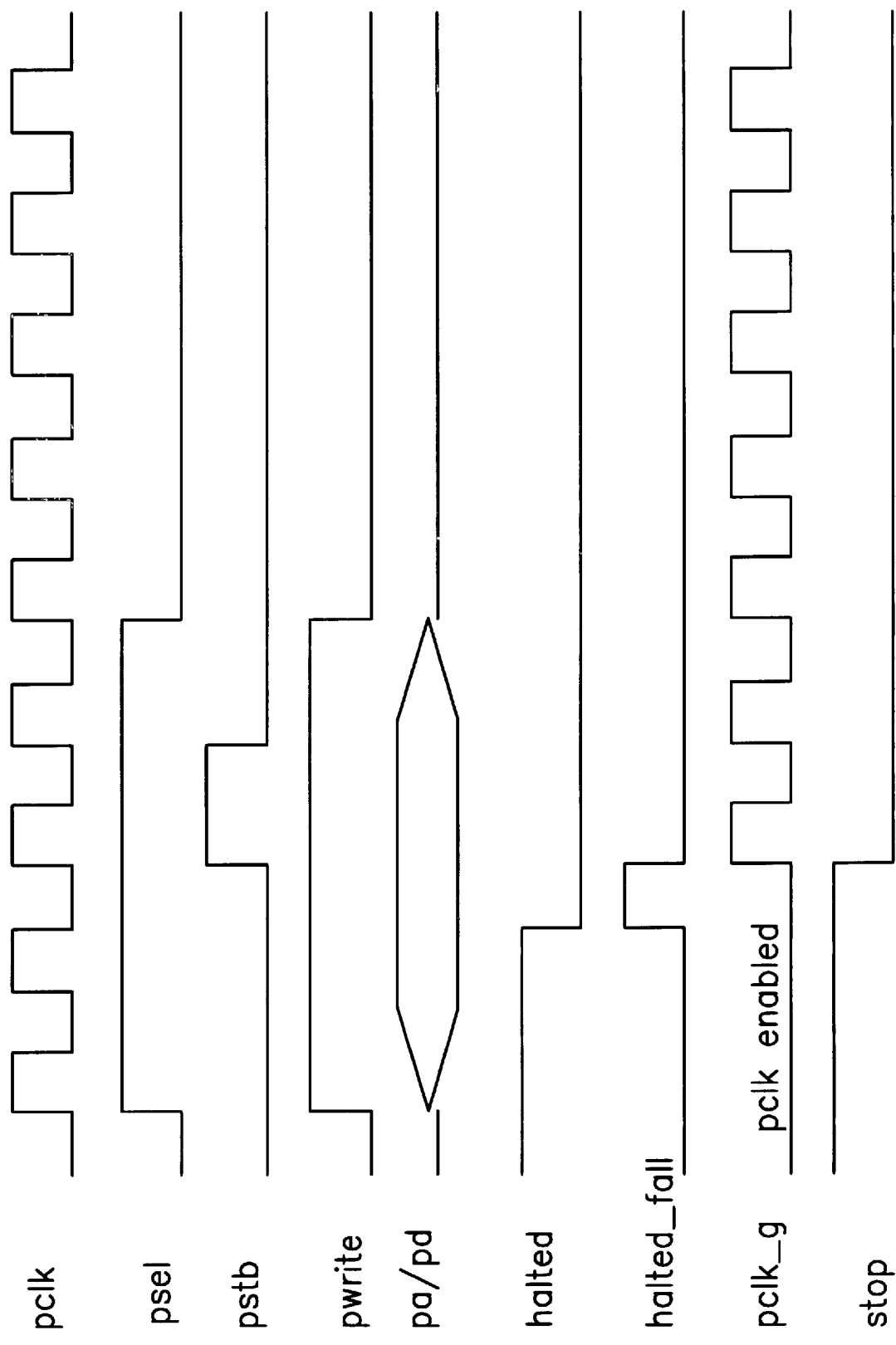
FIG. 6-b

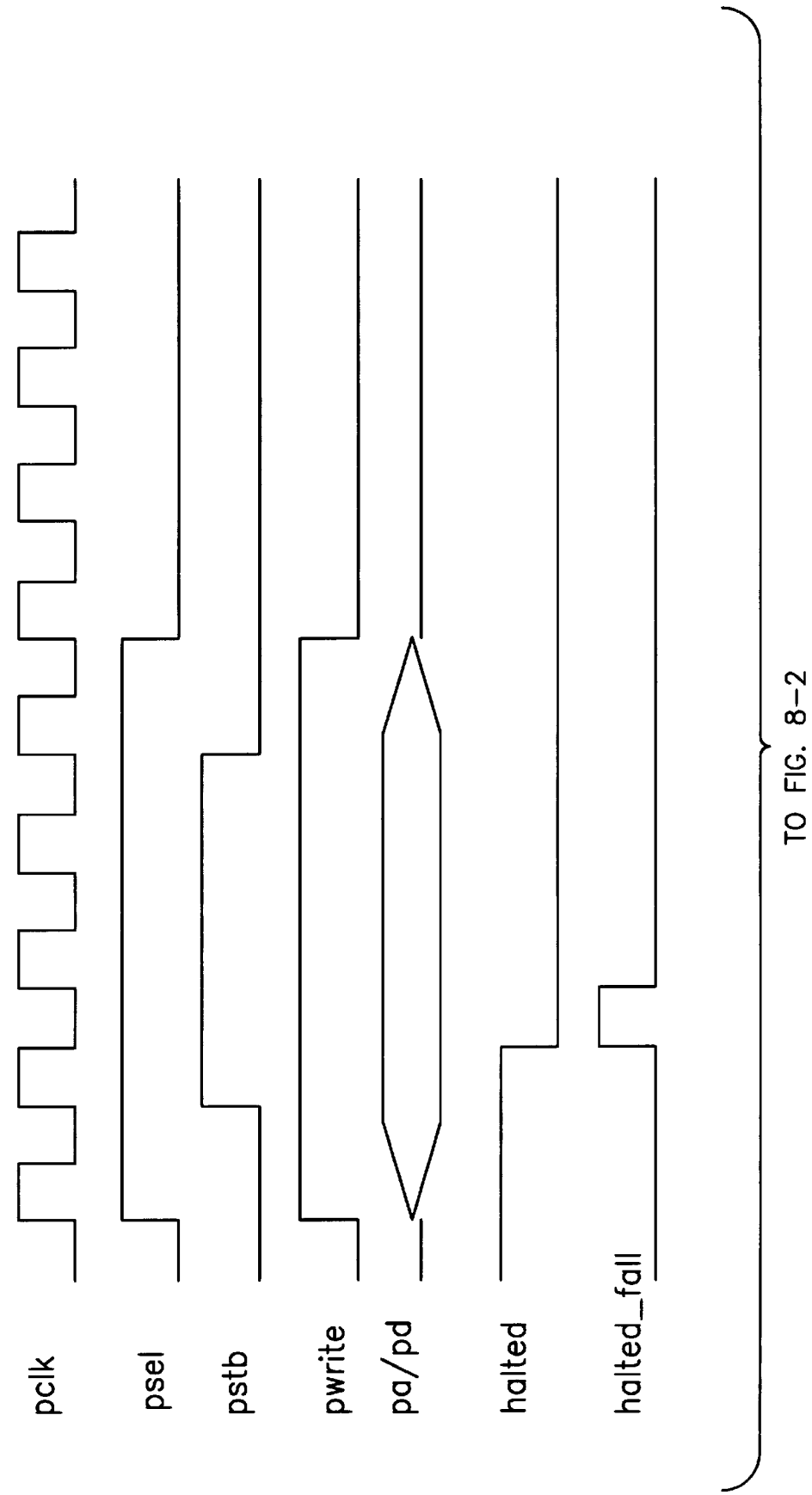

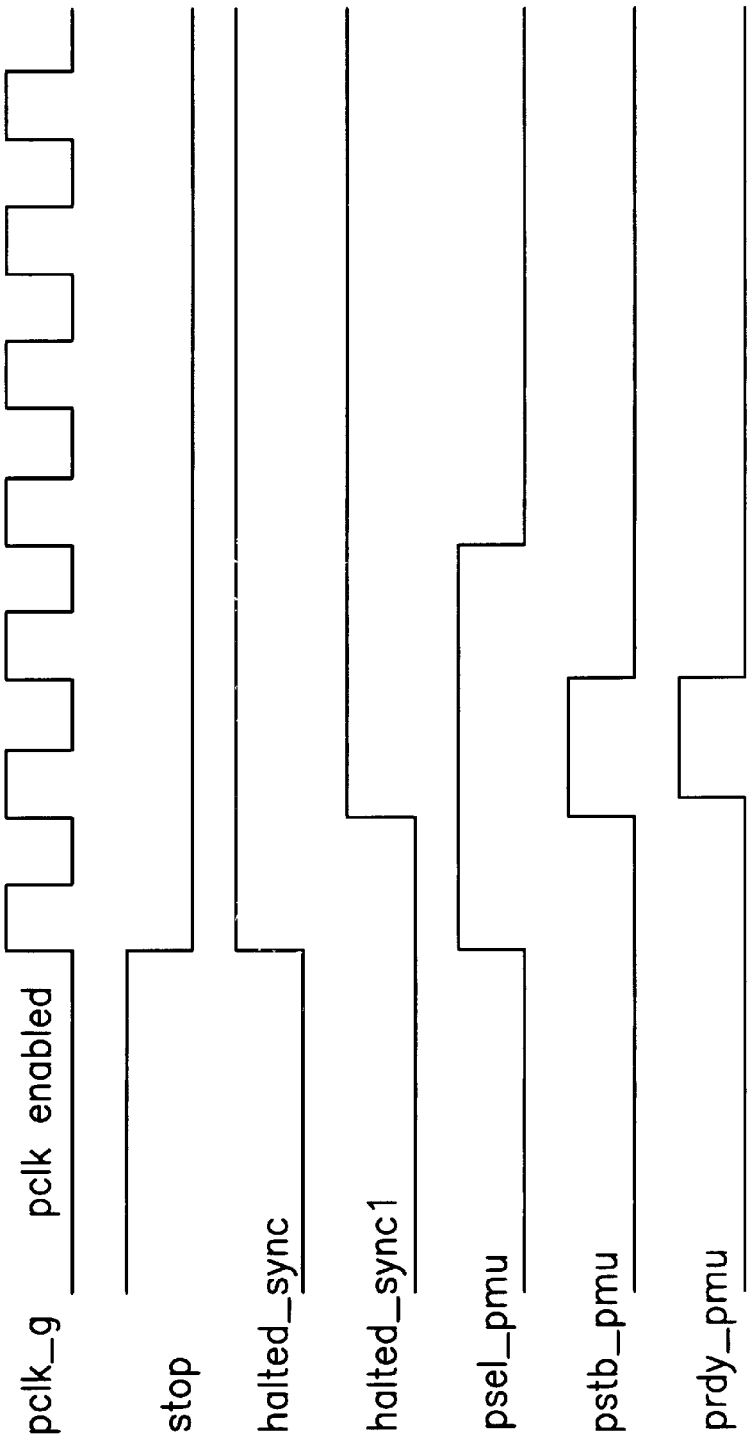

POWER MANAGEMENT METHOD AND ARRANGEMENT FOR BUS-COUPLED CIRCUIT BLOCKS

FIELD OF THE INVENTION

This invention relates generally to digital electronic equipment, and more particularly to methods and apparatus for reducing power consumption for personal computer systems.

BACKGROUND OF THE INVENTION

The electronics industry continues to strive for high-powered, high-functioning circuits. Significant achievements in this regard have been realized through the fabrication of very large-scale integration of circuits on small areas of silicon wafer. Integrated circuits of this type are developed through a series of steps carried out in a particular order. Main goals in designing such devices include realizing a device that operates at high speeds while consuming relatively small amounts of power.

There are variety of reasons why computer designers wish to reduce power consumption in personal computers. Portable computers, for example, typically depend on batteries for power; the less power consumed by the portable computer circuitry and peripherals, the longer the batteries will last. In addition to portable computer applications, it is also often desirable to have stationary (e.g., desktop) computers that consume less power. This is because reduced power consumption reduces energy costs and, in a cumulative sense, reduces the negative environmental impacts of excessive energy consumption. Furthermore, desktop computers designed to consume less power also generate less heat, which means that they can be made smaller and with reduced cooling requirements.

Previous approaches have been used to reduce power consumption in such devices. One approach, for example, is to shut down peripherals or very large functional system blocks that have not been used for a predetermined period of time. Another known technique reduces computer power consumption by reducing the speed of the clock driving the digital circuitry. Since there is a direct relationship between clock rate and power consumption, any lowering of the clock rate will typically reduce power consumption.

Semiconductor devices are used in large numbers to construct most modern electronic devices. In order to increase the capability of such electronic devices, it is necessary to integrate even larger numbers of such devices into a single silicon wafer. As the semiconductor devices are scaled down (i.e., made smaller) to form a larger number of devices on a given surface area, the structure of the devices and the fabrication techniques used to make such devices have become more refined. This increased ability to refine such semiconductor devices has lead to an ever-increasing proliferation of customized chips and, for many applications, each chip is typically driven by one or more operational clocks for communication on a common data bus. In these common bus applications, attempting to manage power consumed by each of these chips is burdened by a number of delays resulting from transitioning a power-reduced chip or block to fully-operational mode.

Accordingly, there is a need for a way to manage power consumption to communicatively-coupled chips or functional blocks in a manner that is efficient and consistent with the ideal of realizing a device that operates at high speeds while consuming relatively small amounts of power.

SUMMARY OF THE INVENTION

The present invention is directed to addressing the above need by way of a power-efficient multi-block data processing arrangement that permits transition of a power-reduced chip or block to fully-operational mode in a manner that is transparent to an access of the power-reduced chip or block.

According to one embodiment, a power management system permits power-reduced operation of selected circuit blocks in a manner that is transparent to other bus-coupled circuit blocks. Consistent with one embodiment of the present invention, the approach is implemented in a digital electronic circuit arrangement having an accessing circuit block coupled to a clocked circuit block over a data bus. The clocked circuit block is power managed by decreasing, e.g., reducing or blocking, the clock speed to the clocked circuit block which impedes its ability communicate over the data bus. Once the clocked circuit block is set in a reduced power mode, the bus is monitored for data-access communications from the accessing circuit block to the clocked circuit block. In response to such a communication, a substitute response is generated on the data bus, directed to the accessing circuit block, and the clock speed to the clocked circuit block is increased and brought out of the reduced power mode for further communications with the accessing circuit block. The substitute response is presented during a clock period during which the clocked circuit block would respond when in a mode other than the reduced power mode.

Other aspects of the present invention are directed and related to circuit arrangements and methods using the above approach or variations thereof.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 2A is an example arrangement of a clock generation circuit, according to an example application of the present invention;

FIG. 3A is a timing diagram illustrating the response signals provided by the power management circuit to a wakeup signal source, according to an example application of the present invention;

FIG. 6A is a timing diagram of a power management circuit controlled peripheral clock for a 3-clock VPB bus cycle, according to an example application of the present invention;

FIG. 6B is another timing diagram of a power management circuit controlled peripheral clock for a 3-clock VPB bus cycle with enhanced data setup, according to an example application of the present invention;

FIG. 8 is a timing diagram of another power management circuit controlled peripheral clock for a 3-clock VPB bus cycle, according to an example application of the present invention.

Figure 1:
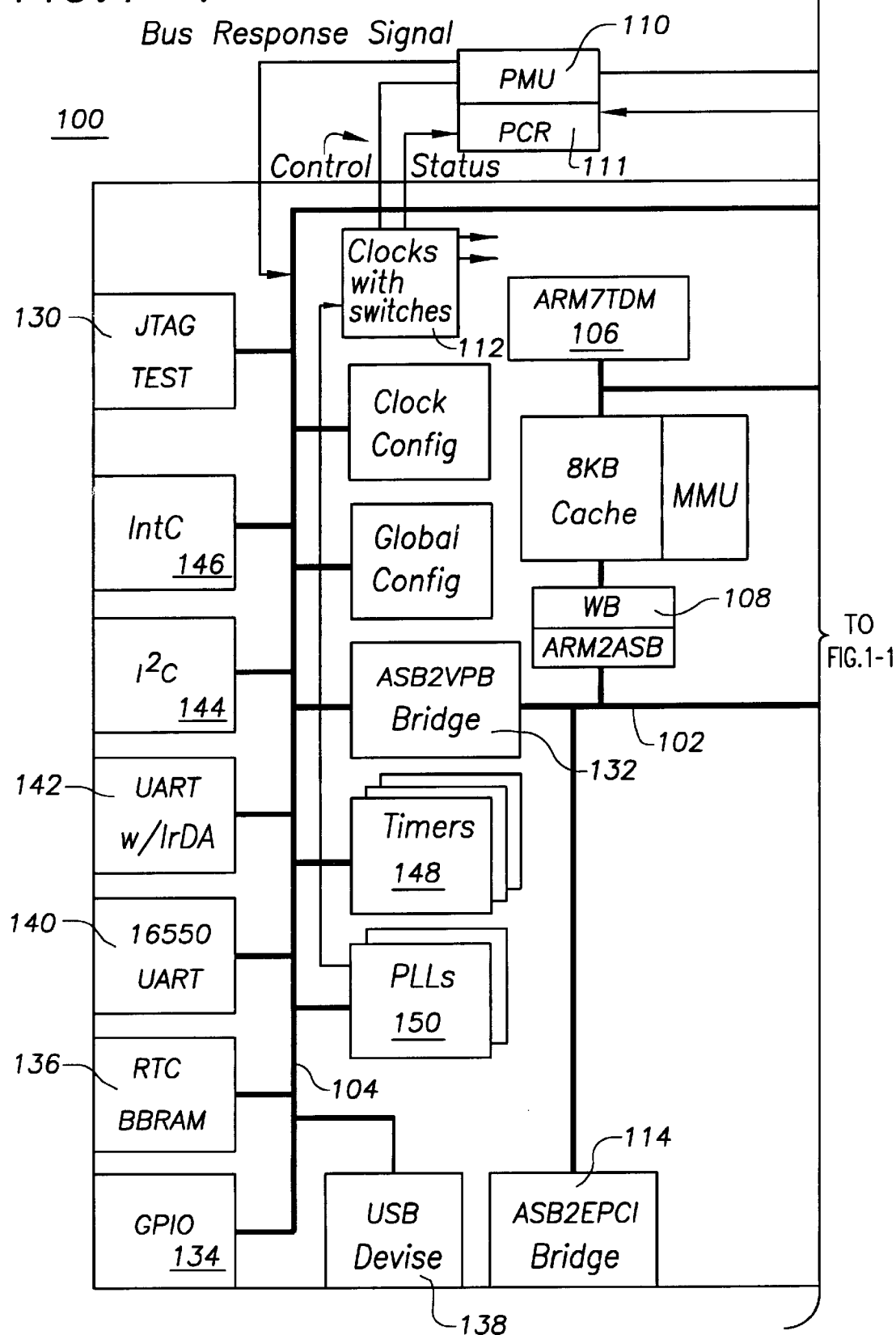
FIG. 1 is an example arrangement of bus-coupled circuit blocks, according to an example application of the present invention.

While the invention is amenable to various modifications and alternative forms, specifics thereof have been shown by way of examples in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be generally applicable to the design of semiconductor chip devices that are communicatively coupled via a data bus and clocking circuitry. The invention has been found to be particularly advantageous for applications involving the semiconductor chips that benefit from operation that is transparent to a first functional block requesting access of a power-managed, second functional block over such a data bus. While the present invention is not so limited, an appreciation of various aspects of the invention is best gained through a discussion of examples in such an environment, as presented in the discussion below.

In an example embodiment, a method for managing power consumed by a plurality of clocked blocks in a bus-coupled data processing arrangement employs a clock-control circuit to control the speed of, and therefore the power-consumed by, the clocked blocks. The clocked circuit block is power managed by decreasing, e.g., reducing or blocking, the clock speed to the clocked circuit block which impedes its ability communicate over the data bus. This power-reduced operation is achieved in a manner that is transparent to other bus-coupled circuit blocks attempting to communicate with the clocked block that is operating in the power-reduced mode. Once the clocked circuit block is set in a reduced power mode, the bus is monitored for data-access communications from the accessing circuit block to the clocked circuit block. In response to such a communication, a substitute response is generated on the data bus, directed to the accessing circuit block, and the clock speed to the clocked circuit block is increased and brought out of the reduced power mode for further communications with the accessing circuit block. The substitute response is presented during a clock interval during which the clocked circuit block would respond when in a mode other than the reduced power mode. By effecting the substitute response in a manner that is transparent to the requesting block, this aspect of the present invention advantageously provides power management of a block within a bus-coupled circuit from outside of the circuit without altering or changing the design of the block being power managed.

The above example embodiment is applicable to various types of bus-coupled data processing arrangements in which one or more clocked circuit blocks are accessed using circuit-block addressing by another circuit block requesting data therefrom over a bus which can be monitored. In this regard, various embodiments of the present invention are directed, for example, to processing arrangements using the Advanced Microcontroller Bus Architecture ("AMBA"), AMBA-Advanced Peripheral Bus ("APB"), high-speed busses such as the Advanced High-performance Bus ("AHB"), and other types of ARM-based data processing arrangements. Other embodiments of the present invention are directed to IBM's CoreConnect on-chip bus, Motorola's IP-bus, as an alternative power-saving approach to the arrangement illustrated and described in U.S. Pat. No. Re. 36,839, and other data high-performance bussing CPU arrangements as further exemplified below.

Referring now to the figures, FIG. 1 illustrates an arrangement of bus-coupled circuit blocks 100 that are power managed according to an example embodiment of the present invention. The power management system of the present invention permits power reduced operation of selected circuit blocks in a manner that is transparent to other bus coupled circuit blocks and transparent to a circuit block assessing a block within bus-coupled circuit blocks 100. Application or customer specific functional blocks can be integrated into various aspects of circuit 100 including one or more of the illustrated blocks coupled to an Advanced System Bus (ASB) bus 102 and a VLSI Peripheral Bus (VPB) bus 104. Communication is implemented with the ASB and VPB blocks of circuit 100 through the respective busses using a master/slave communication relationship. The master/slave communication can be implemented in a number of ways including using the approach described in connection with Ser. No. 09/216,291 filed Dec. 18, 1998 or U.S. Pat. No. 6,154,803 to Pontius. In this context, the master is the device or accessing circuit block initiating the communication and the slave is the targeted respondent, or a bus-coupled circuit block within circuit 100) of the initiated communication.

Circuit 100 includes a variety of bus-coupled devices. Among the many illustrated are an ARM CPU 106, an ASB-to-VPB interface 108 and a power management circuit (PMU) 110 coupled to ASB bus 102 and to VPB bus 104. The power management circuit 110 is designed to manage clocks connected to various ones of the clocked blocks within circuit 100, i.e., those that communicate on the busses with the assistance of a clock control circuit 112. When external devices communicate using the bus 102, PMU 110 includes a logic circuit adapted to determine or sense whether a "sleeping" block is being address on the bus and, if so, to send a wakeup signal for the addressed block. In one specific implementation, the clock control circuit 112 responds to the wakeup signal for the addressed block by permitting the clock signal that is coupled to the addressed block to cycle at full speed. If the "sleep" mode corresponds to the addressed block running at a slower clock speed (as generated, for example, by the clock control circuit 112), then this wakeup task would entail returning the clock speed to full speed. Whereas, if the "sleep" mode corresponds to the addressed block having its clock completely disabled, for example, by the clock control circuit 112, then this wakeup task would entail turning the clock on again for the addressed block. In either instance, the clock speed is increased to effect a return from the low-power mode.

In this example arrangement, circuit 100 includes bus-bridge interfaces, such as a bus-bridge interface PCI-bridge 114, for coupling external devices with an internal circuit block. CPU 104 communicates with multiple memory units 122, 124 and 128 via external bus interfaces 120 and 126. Multiple memory units include Flash, SRAM and DRAM types memory devices; others, including ROM memory, may be used as well. Circuit 100 also includes interfaces such as, but not limited to, a JTAG test port 130 for a JTAG test interface, an on-chip ASB2VPB bridge interface 132, a general purpose input/output interface 134 for interfacing with a display (dot-matrix or segment-type) and an input device, a battery-powered real-time clock (RTC) unit 136, a universal serial bus (USB) device interface 138, a UART device 140 and a UART with an IrDA interface 142, an I²C interface 144, an internal clock 146, timers 148 and PLLs 150. When the bus 102 is implemented using the illustrated AMBA-ASB bus, bus arbitration signals are as defined by the bus interface and respectively driven by a central bus decoder 152 and a central bus arbiter 154.

While it will be appreciated that the tasks assigned to the PMU 110 can be implemented in a self-contained block or dispersed within various other blocks coupled to the busses (e.g., the clock generation circuit 112 and/or the ARM CPU 106), the example circuit 100 in FIG. 1 depicts PMU 110 configured to intercept, for control purposes, the clocks coupled to the circuit blocks that are to be power managed. The discussion below is directed to the example embodiment of the operation of the PMU of the present invention.

PMU 110 includes a power control register (PCR) 111 that is coupled to ASB bus 102 and to VPB bus 104. There is a corresponding register in PCR 111 for each block in circuit 100 that is to be power managed by PMU 110. Clock generation circuit 112, which is always running and has the clock signals directed by PLLs 150, includes a switching circuit for each block in circuit 100 that needs to be controlled and uses both BCLK and NBCLK signals. Clock switches are placed in various locations in circuit 100 depending on how the clock to each block is generated and depending on which circuit blocks are to be power managed. Each clock that is to be controlled includes a clock switch.

Figure 2B:
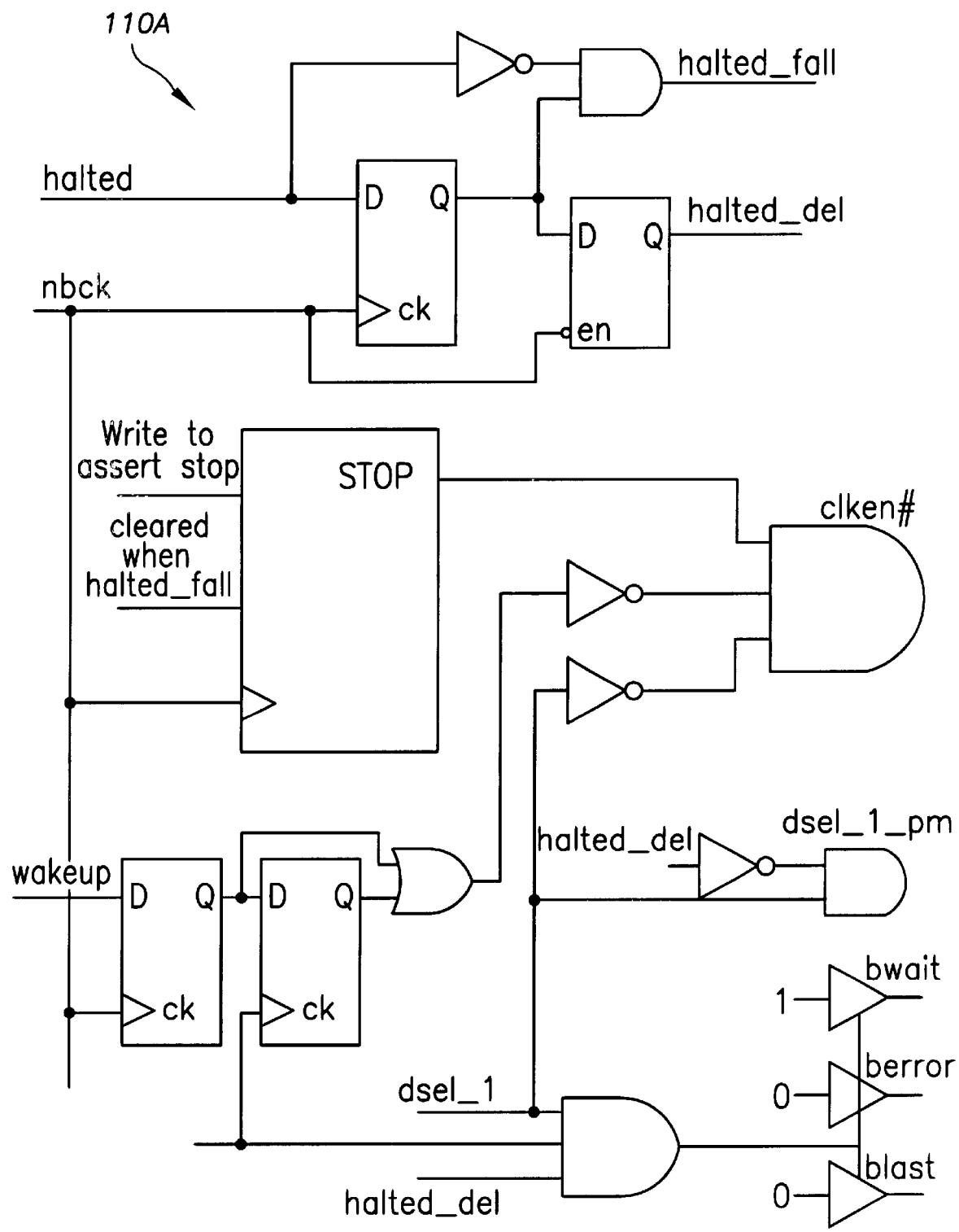
FIG. 2B is an example arrangement of a power management circuit with clock control, according to an example application of the present invention.

Referring now to FIGS. 2A–2B, a clock generation circuit 112 and a power management circuit 110A with clock control for an ASB slave, respectively, are example embodiments of the present invention. In placing a circuit block to sleep in order to conserve power, the clock coupled to the selected target circuit block is either stopped or the signal going to the circuit block is blocked when the user writes an instruction to the STOP bit (see FIG. 2B) of the corresponding blocks within PCR 111 of the PMU 110A. PMU 110A generates a clock enable signal CLKEN# which is fed to clock generation circuit 112 (of FIG. 2A). Clock generation circuit 112, in response to the CLKEN# signal from PMU 110A, turns OFF the clock to the targeted block after the falling edge of the clock and asserts the halted signal HALTED. The targeted block is now in a power-reduced or "sleep" mode until a clock signal is received to re-engage the target circuit block.

In accessing individual circuit blocks of circuit 100, PMU 110 of FIG. 2B senses that a device (or target circuit block) is being accessed by looking at the DSEL (device select), PSEL (peripheral select) or an external signal, such as a wakeup signal, which serves as a wakeup to the block. All of these signals are combined together (see FIG. 2B) to form the CLKEN# signal that is fed to clock generation circuit 112 of FIG. 2A. A non-halted signal is sent from the generation circuit 112 to the target block so as to re-engage the previously power-reduced circuit block.

Figures 1, 3B:
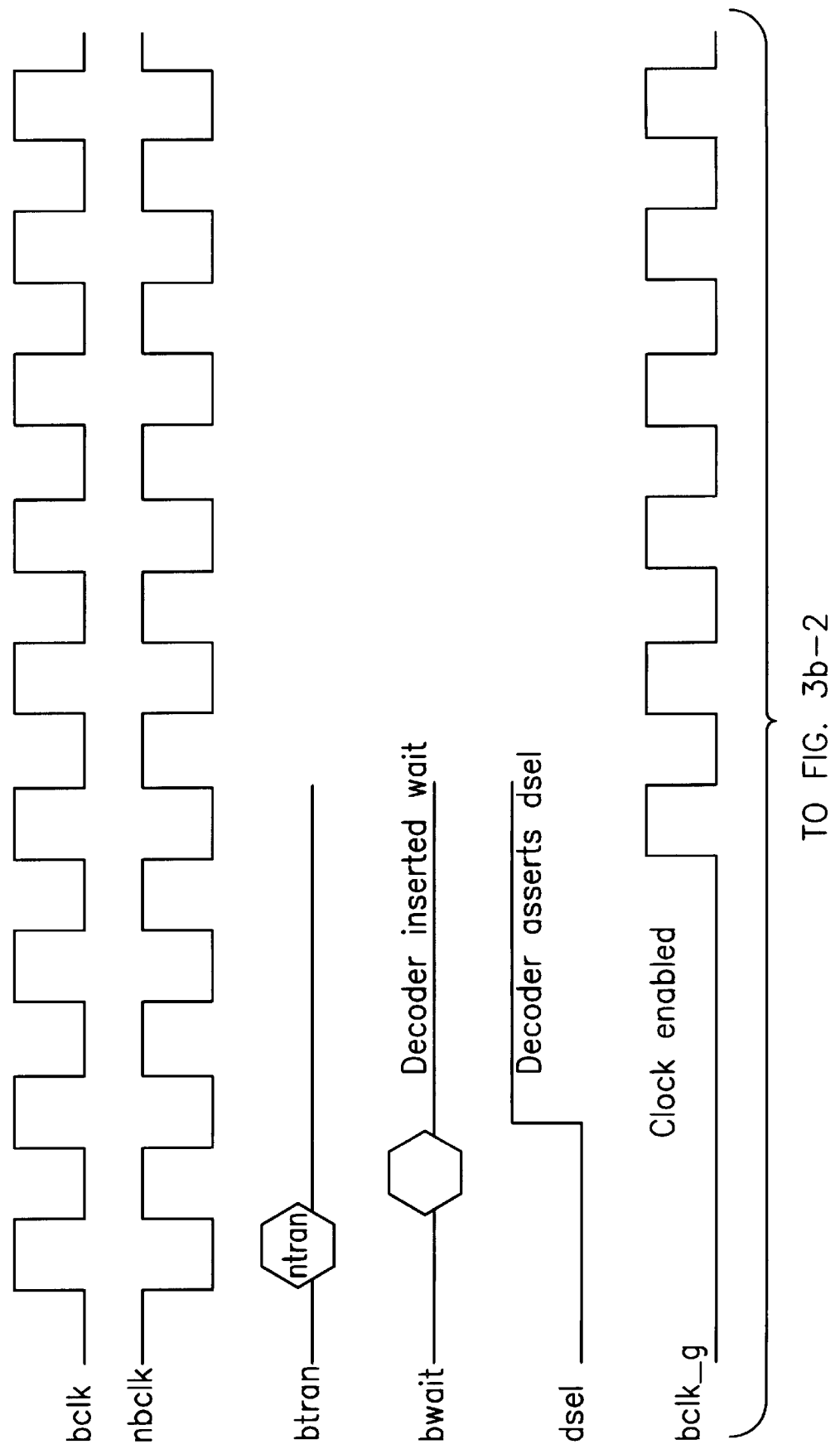
FIG. 3B is another timing diagram illustrating the response signals provided by the power management circuit to a wakeup signal source, according to an example application of the present invention.

Referring now to FIGS. 3A and 3B, example timing diagrams illustrate response signals provided by the power management circuit to a wakeup source as a function of the clock domain that is in control. In particular, BCLK corresponds to the bus clock timing while NBCLK is the same signal only inverted. When an ASB device (or target circuit block) is being accessed by an ASB master (an accessing circuit), PMU 110A takes over the ASB bus as soon as the DSEL signal is sensed. PMU 110A gates the signal to the ASB slave (as in FIG. 2B) and provides a BWAIT signal to the master while the clock is being turned ON. In a related embodiment, PMU 110A gates the signal and provides either a BLAST or BERROR signal to the master.

Once the clock of the ASB slave is turned on, PMU 110A allows the DSEL signal to pass through and moves in the background allowing the ASB slave being accessed to respond. The PMU satisfies the handshake requirements for both the master and the slave while the clock is being turned ON. On the master side, the PMU provides the BWAIT signal (and other response signals) giving the master the appearance that the slave is asking the master to wait. On the slave side, the PMU through PCR 111 turns on the clock(s) of the slave(s) and then allows the DSEL to pass through giving the appearance that the master has begun to access the slave and that the slave must respond with the correct response signals. Depending on the blocks in circuit 100, the master will use either the BCLK or the NBCLK or both while the slave just uses the NBCLK domain for control.

In both timing diagrams of FIGS. 3A and 3B, an NTRAN state is present between the first and second falling edges of the NCLK while the decoder both executes a WAIT state at the second NBCLK clock cycle and asserts a high DSEL signal at the falling edge of the second NBCLK clock cycle. However, where the NBLCK clocking is used in connection with the PMU, as shown in FIG. 3A, the PMU will insert only two WAIT state signals in gating the DSEL signal since the halted signal stops at the falling edge of the NBCLK cycle and a single halted_fall signal ends as the next leading edge of NBCLK cycle begins. The halted_fall signal ends the STOP signal that in turn triggers the end of the halted_del signal, thereby only permitting two WAIT states to be inserted. Where the BLCK clocking is used in connection with the PMU, as shown in FIG. 3B, the PMU will insert three WAIT state signals in gating the DSEL signal since the STOP signal and the halted_del end a half cycle later due to the BCLK clock cycle. Using the approach of the present invention, the PMU is able to turn ON the clock to an ASB block transparent to the master and slave.

Figure 4A:
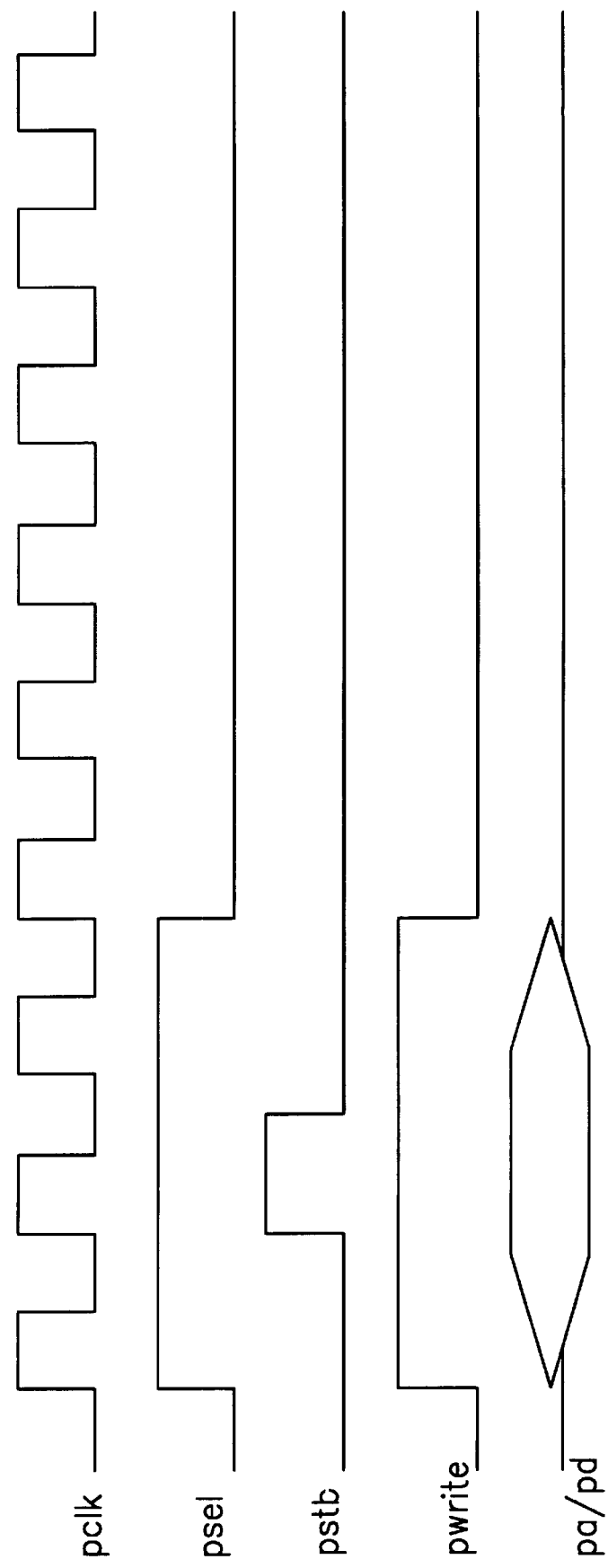
FIG. 4A is a timing diagram of a 3-clock VPB device clock cycle, according to an example application of the present invention.
Figure 4B:
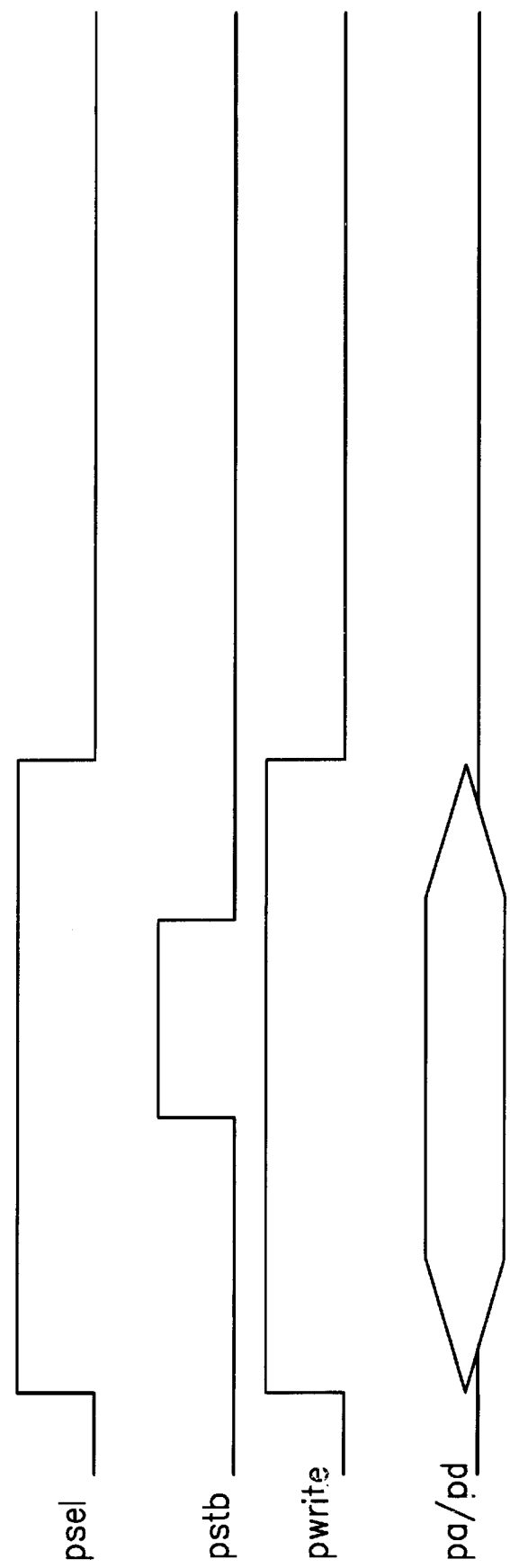
FIG. 4B is another timing diagram of a 3-clock VPB bus cycle with enhanced data setup, according to an example application of the present invention.

When the wakeup signal is from an external source, the CLKEN# signal (see FIG. 2B) is asserted by the PMU and the clocks are simply turned ON allowing the ASB or VPB device to respond to the request. The PMU does not have to provide any bus responses back to a master because the request is from an external source. In FIG. 4A, example timing diagrams illustrate a VPB device being accessed over a period of about 3 clock cycles. Upon accessing the VPB device, the ASB-VPB Bridge directs the response signals to the ASB bus. The VPB device addressing and data set-up typically takes 3 or 4 clock cycles to complete, as shown in the timing line of PAJPD; the number of cycles depends on the design of the ASB-to-VPB bridge 132. ASB-to-VPB Bridge 132 accesses the peripheral by asserting the PSEL and then puts out the address and data. During this time the PSEL and PWRITE signals are high indicating that the device is being selected and written to. During the second full clock cycle the PSTB goes high while data transfer is occurring. The clock then settles on the address and data, after which the address and data signals disappear. In FIG. 4B, similar example timing diagrams illustrate a VPB device being accessed over a period of about 4 clock cycles due to an enhanced data setup. Note that the enhanced data set-up lengthens the duration of the PSEL and PWRITE signal while delaying the PSTB signal by about one clock cycle.

Figure 5:
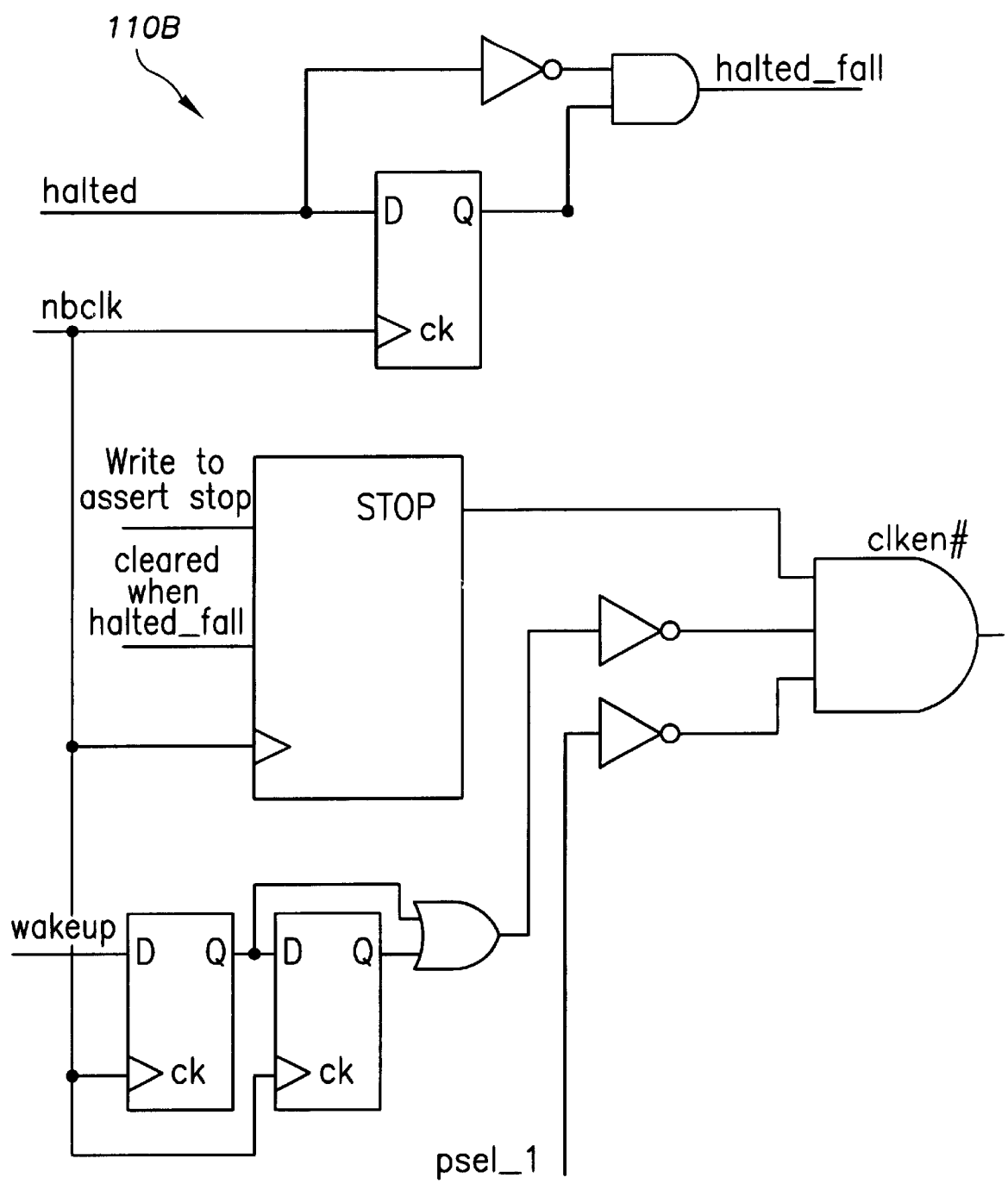
FIG. 5 is an example arrangement of a power management circuit with clock control of a VPB device., according to an example application of the present invention.

Referring now to FIG. 5, a power management circuit 110B operates with a clock control for a VPB slave device according an example embodiment of the present invention. In this embodiment, circuit 110B operates without VPB bus control signals PSEL, PSTB and PRDY. PMU circuit 110B differs from PMU circuit 110A in that PMU 110B does not provide a halted_del signal generated from a second flip-flop (see FIG. 2B). Upon sensing the PSEL signal, the PMU commences to turn the clock ON of the targeted clock block by sending a CLKEN# signal to the clock configuration 112, thereby re-engaging the clock of the targeted circuit block.

Referring now to FIGS. 6A–6B, example timing diagrams illustrate PMU managed PCLK for a VPB device according to an example embodiment of the invention. In FIG. 6A, example timing diagrams illustrate a VPB device being accessed over a period of about 3 clock cycles. The VPB device addressing and data set-up typically takes 3 or 4 clock cycles to complete, as shown in the timing line of PA/PD, with the first one or two clock cycles used for the initial data set-up. This allows sufficient time to turn the clock ON before the falling edge of PSTB arrives. ASB-to-VPB Bridge 132 accesses the peripheral by asserting the PSEL and then puts out the address and data. During this time the PSEL and PWRITE signals are high indicating that the device is being selected and written to. During the second full clock cycle the PSTB goes high while data transfer is occurring. The clock then settles on the address and data, after which the address and data, signals disappear.

In FIG. 6B, example timing diagrams illustrate a VPB device being accessed over a period of about 4 clock cycles due to an enhanced data setup. Note that the enhanced data set-up lengthens the duration of the PSEL and PWRITE signal while delaying the PSTB signal by about one clock cycle. The timing diagrams also illustrate that the VPB device captures the data on the rising edge of the clock when PSEL, PSTB and PWRITE are asserted. In comparing FIGS. 6A and 6B, even though there is an enhanced data set-up in FIG. 6B, the halted signal remains high for two cycles, the halted_fall goes high for a half-cycle and the stop signal remains high for 2.5 cycles for both data set-ups. In addition, the pclk is enabled, as pclk_g signal goes high, at the falling edge of the stop bit for both figures, despite the data set-up duration, and pclk_g continues with the same timing pattern as the pclk signal. In this embodiment, the clock of the VPB device is turned ON transparent to the VPB block with a simplified PMU circuit 110B that does not require that a signal be sent to a master, where the master is the accessing circuit.

Figure 7:
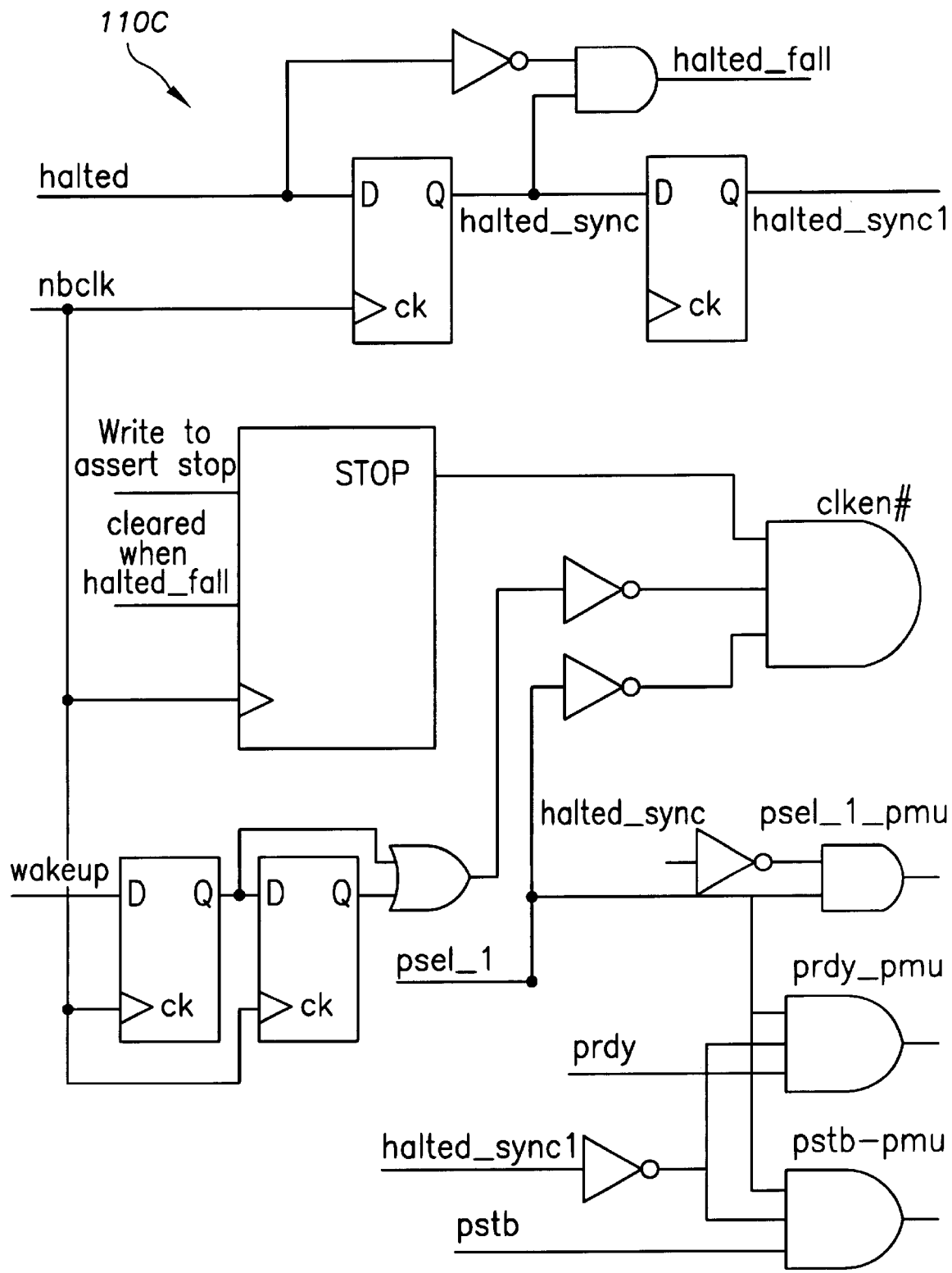
FIG. 7 is an example arrangement of another power management circuit with clock control of a VPB device, according to an example application of the present invention.

Referring to FIG. 7, a power management circuit 110C operates with a clock control of a VPB slave device according to another example embodiment of the present invention. PMU circuit 110C provides additional logic for relaying PSEL, PRDY and PSTB control signals to the clock of the VPB device clock. In this embodiment, the VPB slave device is allowed access only after the VPB device's clock has been turned ON by gating the PSEL and PSTB signals sent to the clock block and providing a peripheral read (PRDY) response to the ASB-to-VPB Bridge. The PRDY control signal from the PMU is formed by adding with an AND gate the PRDY signal from the targeted VPB block with the inverted halted_sync_1 signal from the PMU. The PSTB control signal from the PMU is formed by adding with an AND gate the PSTB signal and the inverted halted sync 1 signal from the PMU. The PSEL control signal from the PMU is formed by adding with an AND gate the PSEL signal and the inverted halted_sync signal from the PMU. Once the clock to the VPB block is turned ON the PMU allows the PSEL to pass through to the VPB block. The PMU also asserts the ready signal allowing the PPDY signal from the VPB block to be passed through to the ASB-to-VPB Bridge and the PSTB signal pass through to the VPB block being accessed.

Referring to FIG. 8, example timing diagrams illustrate a PMU managed PCLK for a VPB device according to another example embodiment of the present invention. The VPB device is being accessed over a period of about 5 cycles with a configuration that gates the PSEL and PRDY signals. The first one or two clock cycles are used to setup the data (see PA/PD), allowing sufficient time to turn the clock ON before the falling edge of PSTB arrives. The VPB device captures the data on the rising edge of the clock when PSEL, PSTB and PWRITE are asserted. Prior to prdy_pmu going high, the high halted signal goes low thereby causing the halted_ fall signal to go high for about half a cycle. At the falling edge of the halted-fall signal the pclk is enabled (pclk_g goes high) while the stop signal drops to a low and the halted_sync and the psel_pmu go high. One cycle later, halted_sync_1 and pstb_pmu go high with prdy_pmu going high shortly thereafter. As the PSTB signal goes low, pstb_pmu and prdy_pmu go low with the psel_pmu following the PSEL signal in both going low at the same time. Once the VPB device is enabled, pclk and pclk_g continue to clock at the same rate. The PMU is able to turn on the clock to the VPB device being accessed transparent to the circuit block of the device being accessed.

In a related application, VPB and ASB clocks are turned OFF and then ON by writing to the stop bit and then accessing the VPB or ASB device using either the ASB or the VPB bus. The present invention is applicable to various types of bus-coupled circuit arrangements where clocks can be controlled to save power. The present invention should not be considered limited to the particular examples described above, but rather should be understood to cover all aspects of the invention as fairly set out in the attached claims. Various modifications, equivalent processes, as well as numerous structures to which the present invention may be applicable fall within the scope of the present invention. For example, the busses illustrated above do not necessarily have to be of the types discussed above. Further, the skilled artisan will appreciate that, while the timing circuitry is useful in understanding how example embodiments and applications may be readily designed for particular example applications, other timing circuitry and related circuit chip arrangements are also acceptable. The claims are intended to cover such alternative approaches as well.

What is claimed is:

1. A method for managing power consumed in a digital electronic circuit arrangement having an accessing circuit block coupled to a clocked circuit block over a data bus, the clocked circuit block communicating over the data bus in response to a clock signal, the method comprising:

setting the clocked circuit block in a reduced power mode by at least decreasing clock speed to the clocked circuit block; and subsequently responding to a data-access communication from the accessing circuit block to the clocked circuit block, generating a substitute response on the data bus directed to the accessing circuit block and increasing the clock speed to the clocked circuit block, the substitute response being presented during a clock period during which the clocked circuit block would respond when in a mode other than the reduced power mode.

2. The method, according to claim 1, further including providing a power management circuit block coupled to the data bus and adapted to activate and deactivate the reduced power mode of the clocked circuit block.

3. The method, according to claim 1, further including providing a power management circuit block coupled to the data bus and adapted to respond to the data-access communication from the accessing circuit block to the clocked circuit block by generating the substitute response on the bus directed.

4. The method, according to claim 1, further including providing a power management circuit block coupled to the data bus and adapted to respond to the data-access communication from the accessing circuit block to the clocked circuit block by increasing the clock speed to the clocked circuit block.

5. The method, according to claim 1, wherein decreasing clock speed to the clocked circuit block includes blocking the clock signal.

6. The method, according to claim 1, further including providing a power management circuit block coupled to the data bus and adapted to monitor the bus for data-access communications from the accessing circuit block to the clocked circuit block.

7. The method, according to claim 6, wherein the step of providing a power management circuit block includes providing a power control register corresponding to the control clock block.

8. The method, according to claim 1, further including providing a power management circuit block coupled to the data bus and adapted to respond to the data-access communication from the accessing circuit block to the clocked circuit block by generating the substitute response on the bus directed and increasing the clock speed to the clocked circuit block.

9. The method, according to claim 8, further including providing a clock control circuit adapted to provide the clock signal to the clocked circuit block and using the power management circuit block to manage clock control circuit.

10. The method, according to claim 9, wherein decreasing clock speed to the clocked circuit block includes blocking the clock signal.

11. A system for managing power consumed in a digital electronic circuit arrangement having an accessing circuit block coupled to a clocked circuit block over a data bus, the clocked circuit block configured and arranged to communicate over the data bus in response to a clock signal, the system comprising:

means for setting the clocked circuit block in a reduced power mode by at least decreasing clock speed to the clocked circuit block; and means for subsequently responding to a data-access communication from the accessing circuit block to the clocked circuit block, generating a substitute response on the data bus directed to the accessing circuit block and increasing the clock speed to the clocked circuit block, the substitute response being presented during a clock period during which the clocked circuit block would respond when in a mode other than the reduced power mode.

12. The system, according to claim 11, further including a power management circuit block coupled to the data bus and configured and arranged to activate and deactivate the reduced power mode of the clocked circuit block.

13. The system, according to claim 11, further including a power management circuit block coupled to the data bus and configured and arranged to respond to the data-access communication from the accessing circuit block to the clocked circuit block by generating the substitute response on the bus directly.

14. The system, according to claim 11, further including a power management circuit block coupled to the data bus and configured and to respond to the data-access communication from the accessing circuit block to the clocked circuit block by increasing the clock speed to the clocked circuit block.

15. The system, according to claim 11, wherein the clock signal to the clocked circuit block is blocked when the clock speed is reduced.

16. The system, according to claim 11, further including a power management circuit block coupled to the data bus and configured and arranged to monitor the bus for data-access communications from the accessing circuit block to the clocked circuit block.

17. The system, according to claim 16, wherein the power management circuit block includes a power control register corresponding to the control clock block.

18. The system, according to claim 11, further including a power management circuit block coupled to the data bus and configured and arranged to respond to the data-access communication from the accessing circuit block to the clocked circuit block by generating the substitute response on the bus directly and increasing the clock speed to the clocked circuit block.

19. The system, according to claim 18, further including a clock control circuit configured and arranged to provide the clock signal to the clocked circuit block, wherein the power management circuit block is configured and arranged to manage the clock control circuit.

20. The system, according to claim 19, wherein the clock signal to the clocked circuit block is blocked when the clock speed is reduced.

* * * * *